United States Patent
O'Flaherty (10) Patent No.: US 7,249,048 B1
(45) Date of Patent: Jul. 24, 2007

(54) INCORPORATING PREDICRIVE MODELS WITHIN INTERACTIVE BUSINESS ANALYSIS PROCESSES

(75) Inventor: Kenneth W. O'Flaherty, La Jolla, CA (US)

(73) Assignee: NCR Corporation, Dayton, OH (US)

( * ) Notice: Subject to any disclaimer, the term of this patent is extended or adjusted under 35 U.S.C. 154(b) by 1447 days.

(21) Appl. No.: 09/608,595

(22) Filed: Jun. 30, 2000

(51) Int. Cl.
G06F 17/30 (2006.01)

(52) U.S. Cl. ...................................................... 705/10
(58) Field of Classification Search .................... 707/6; 709/224; 705/7, 8, 10
See application file for complete search history.

(56) References Cited

U.S. PATENT DOCUMENTS

| | | | |
|---|---|---|---|
| 5,692,107 A * | 11/1997 | Simoudis et al. | 706/12 |
| 5,701,400 A * | 12/1997 | Amado | 706/45 |
| 5,787,425 A | 7/1998 | Bigus | |
| 5,970,482 A * | 10/1999 | Pham et al. | 706/16 |
| 6,393,406 B1 * | 5/2002 | Eder | 705/7 |
| 6,430,539 B1 * | 8/2002 | Lazarus et al. | 705/10 |
| 6,430,615 B1 * | 8/2002 | Hellerstein et al. | 709/224 |

FOREIGN PATENT DOCUMENTS

JP 8-180110 A * 7/1996

OTHER PUBLICATIONS www.kdnuggets.com—Archived on Oct. 12, 1999—a data mining web site with many analysis tools.*
www.ai-cbr.org/iccbr99/presents/iwatson.pdf—Definition of Case Based Reasoning cycle 1999.*

* cited by examiner

Primary Examiner—Susanna M. Diaz
(74) Attorney, Agent, or Firm—Gates & Cooper LLP (57) ABSTRACT

A Customer Relationship Management (CRM) system that incorporates predictive models. The system is used by business users who are unfamiliar with the art of data mining. The predictive model, which is constructed by a model-building mechanism in a data mining subsystem, accepts the appropriate input attributes, performs calculations against a segment comprised of records, and generates an output attribute.

42 Claims, 5 Drawing Sheets

INCORPORATING PREDICRIVE MODELS WITHIN INTERACTIVE BUSINESS ANALYSIS PROCESSES

CROSS REFERENCE TO RELATED APPLICATIONS

This application is related to the following co-pending and commonly-assigned patent application, which is incorporated by reference herein:

Application Ser. No. 09/608,496, entitled "BUILDING PREDICTIVE MODELS WITHIN INTERACTIVE BUSINESS ANALYSIS PROCESSES," filed on same date herewith, by Ken O'Flaherty.

BACKGROUND OF THE INVENTION

1. Field of the Invention

This invention relates in general to database management systems performed by computers, and in particular, to the incorporation of predictive models within a Customer Relationship Management (CRM) system that uses a Relational Database Management System (RDBMS).

2. Description of Related Art

In a data warehouse environment, the function of interactive business analysis is supported by a variety of applications and tools, including RDBMS (Relational Database Management System) and OLAP (On-Line Analytic Processing) tools. Typically, such business analysis tools use metadata to represent business concepts, and to provide a mapping from the business concepts to data stored in the data warehouse. A business analyst can then use familiar business terms to request an analytic function, and the tool will convert the business terms to the appropriate Table/Column names, and generate and then execute the appropriate SQL to perform the function. Thus, the analyst can request a report on "Sales" for "Eastern Region," where "Sales" is a "Measure" and "Eastern Region" is a "Segment." In this example, Segments and Measures are types of metadata, wherein Measures are values or expressions that are useful in reviewing, analyzing or reporting on data elements represented by segments.

The Measures supported by current analytic tools are either simple aggregations (e.g., "Revenues"), or more complex derivations based on formulas (e.g., "Margin"="Revenues−Costs," and "Percent Margin"="Margin/Revenues*100"). In each case, the definitions for the Measures is provided by a human, e.g., by a business analyst during a set-up process that occurs following installation but prior to execution of the tool. Usually, the definitions for the Measures comprise a manual metadata definition process.

A Measure might be predictive, e.g., rather than measure past performance or behavior, it might predict future performance or behavior, typically in the form of a propensity score. For example, it might predict the propensity of a Customer Segment to purchase a product or to terminate service. The formula for a predictive Measure might be provided by a human, based on prior experience or intuition.

A more rigorous approach would be to use a predictive modeling system, the output of which is typically a predictive model which may or may not be in some executable form. Typically, in order to use such a model as a predictive Measure in a business analysis tool, it would be necessary for a human to translate the predictive model formula into an appropriate form (e.g., as SQL statements) that can be processed by the business analysis tool.

Unfortunately, predictive modeling systems are technically complex, and require a high level of statistical and data mining skills to create successful models, including knowledge about the algorithms involved and how they operate. They also typically require expert knowledge of the data involved in the prediction, and programming skills in order to manipulate the data into a form that the predictive modeling system requires.

There is a need then to make data mining algorithms more accessible and more available to business people. There is a strong requirement for marketing campaign planners with modest technical skills (e.g., business analysts) to be able to incorporate predictive models directly in support of their business tasks.

SUMMARY OF THE INVENTION

A Customer Relationship Management (CRM) system incorporates predictive models. The system is used by business users who are unfamiliar with the art of data mining. A predictive model, that has been constructed by a model-building mechanism in a data mining subsystem, accepts the appropriate input attributes, performs calculations against a segment comprised of records, and generates an output attribute.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

DEFINITIONS

In the context of this application, the following terminology is used:

Segment: A Segment is a grouping of data elements organized about one or more attributes. Segments may be subdivided into Sub-Segments based on Attributes or Filters, which may be categorical (such as "Type of Residence," "Marital Status," or "Brand"), numeric (such as "Age >65," or "Price >$25"), etc. Sub-Segments themselves can b further subdivided into Sub-Segments.

Filter: A Filter defines one or more attribute constraints applied to a Segment or Sub-Segment, usually to create a Sub-Segment. For example, a Segment "California Customers" may be constrained to "Female California Customers" by applying a Filter for gender.

Profile: A Profile is a collection of attributes relating to a Segment. For example, a Demographic Profile might include those attributes of a Customer Segment that contain demographic information, such as gender, zip code, marital status, household group, home ownership, vehicle ownership, etc. Pre-defined Profiles may be available, as is the ability to create ad hoc profiles from the available set to attributes for a Segment.

Measure: A Measure is a formula applied against a Segment or Sub-Segment. A Measure may involve simply aggregating values retrieved from a database, computing a formula, or executing a previously-built predictive model.

Function: A Function is a control for splitting, merging, and branching.

Application Template: An Application Template is a sequence of Segments, Filters, Measures and Functions linked together in a workflow, wherein arrows indicate the flow of data.

OVERVIEW

The present invention provides a mechanism for incorporating predictive models in an interactive business analysis environment, where an analyst uses business terms to accomplish his or her tasks, and where the system translates the functions requested by the analyst into SQL statements and then executes these SQL statements against a relational database. A previously-generated predictive model is accessed by the user in the form of a Measure, and is applied against a target Segment, thereby achieving the effect of dynamically characterizing the Segment based on the set of attributes presented with it. This can be used to dynamically score customers based on current information. The present invention also exploits Application Templates to reuse expert knowledge gained from prior model-building experiences, making such knowledge available to lower-skilled business analysts such that they can successfully build predictive models. The present invention also exploits visual programming techniques for constructing and representing the steps in the Application Templates.

ENVIRONMENT

Figure 1:
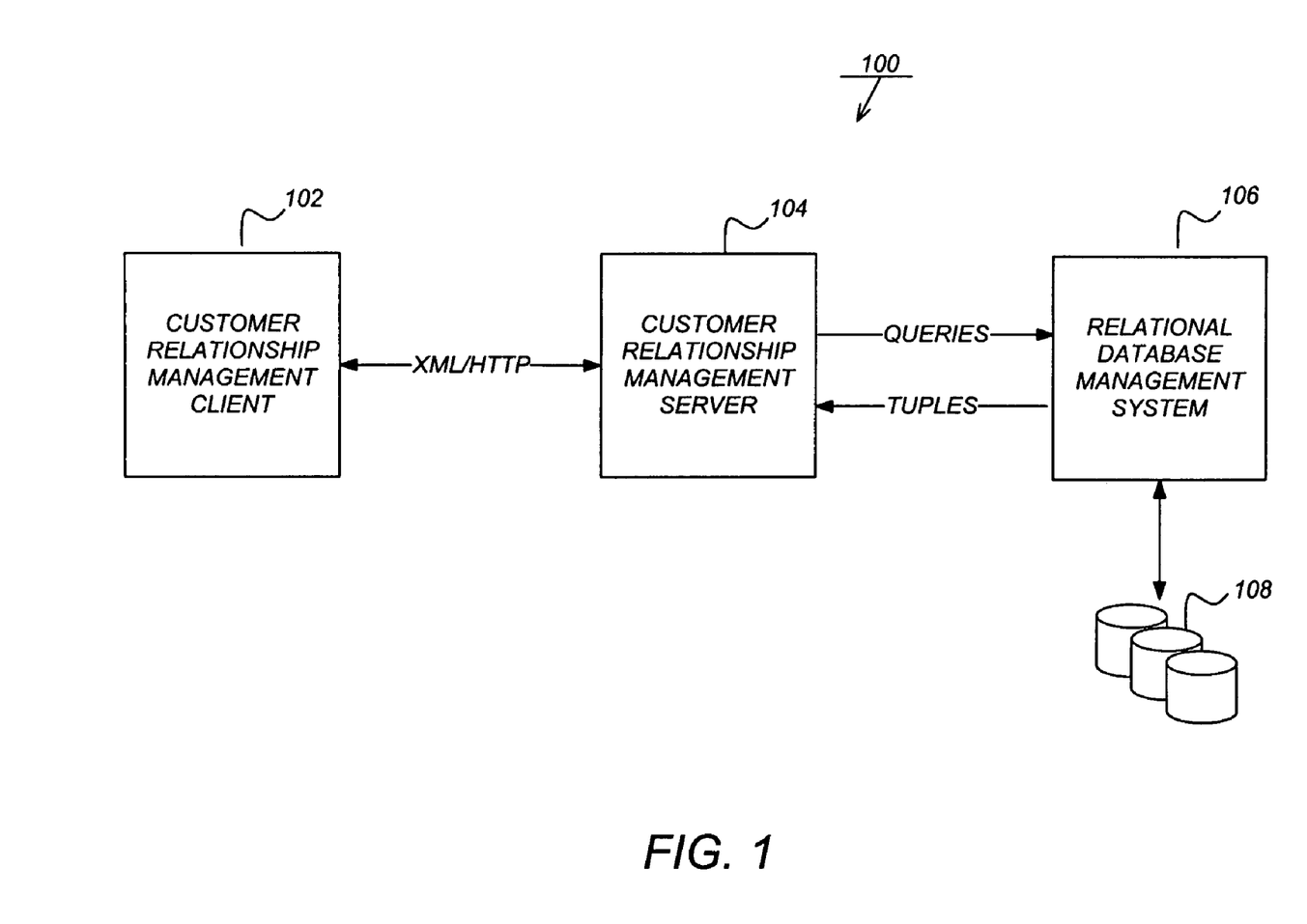
FIG. 1 illustrates an exemplary hardware and software environment that could be used with the present invention.

FIG. 1 illustrates an exemplary environment that could be used with the preferred embodiment of the present invention. In the exemplary environment, a computer-implemented Customer Relationship Management (CRM) system 100 comprises a three-tier client-server architecture, wherein the first tier comprises a CRM Client 102 that provides a graphical user interface (GUI) or other application, the second tier comprises a CRM Server 104 that provides a framework for executing CRM applications, and the third tier comprises a Relational DataBase Management System (RDBMS) server 106 that manages a relational database 108 (which includes both data and metadata).

In the preferred embodiment, the CRM Client 102, CRM Server 104, RDBMS 106, and relational database 108 each comprise logic and/or data tangibly embodied in and/or accessible from a device, media, carrier, or signal, such as RAM, ROM, one or more of the data storage devices, and/or one or more remote systems or devices communicating with the CRM system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

CUSTOMER RELATIONSHIP MANAGEMENT SERVER

Figure 2:
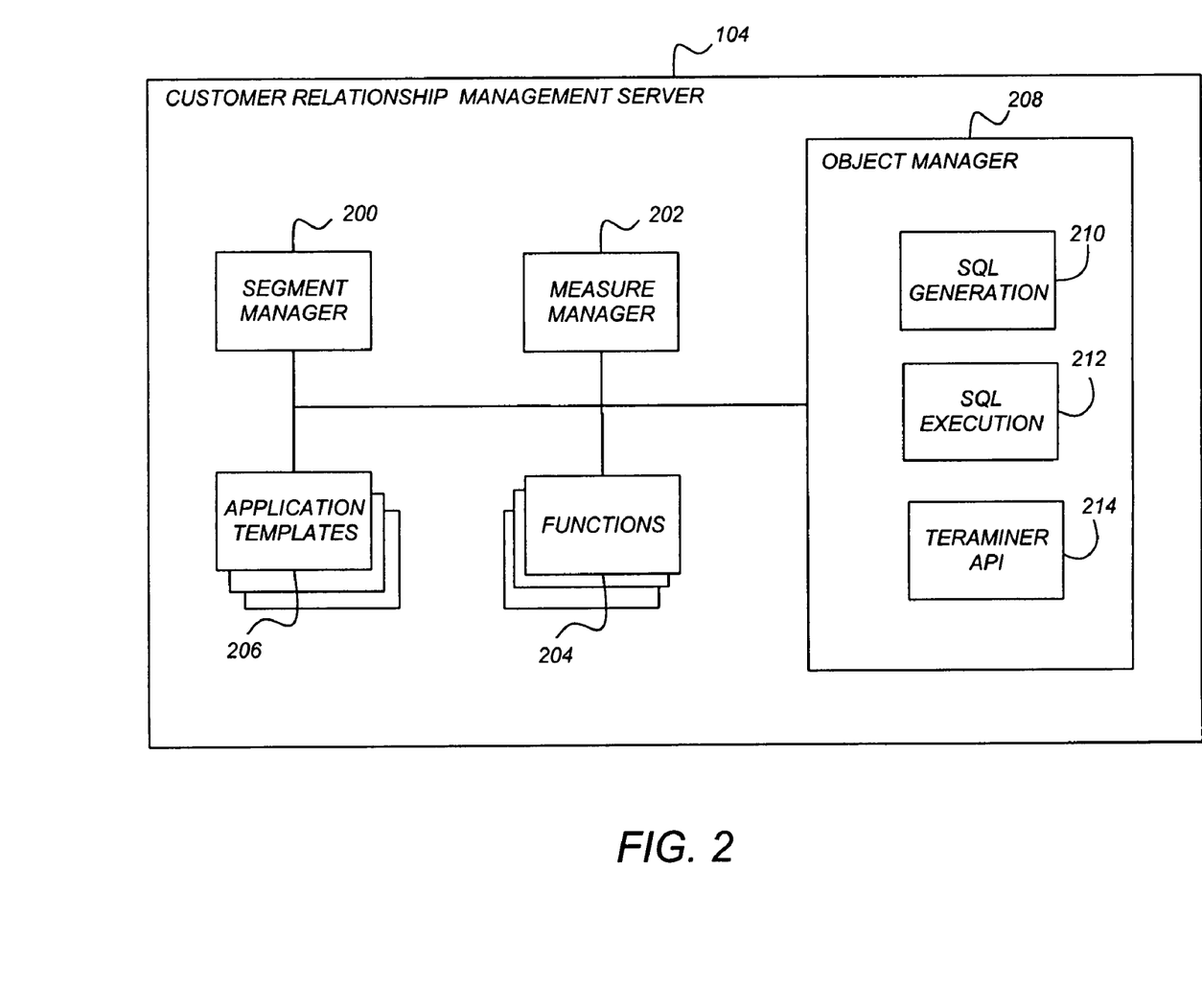
FIG. 2 illustrates an exemplary architecture for the Customer Relationship Management (CRM) Server according to the preferred embodiment of the present invention.

FIG. 2 illustrates an exemplary architecture for the CRM Server 104 according to the preferred embodiment of the present invention. The CRM Server 104 provides a common, adaptable, and extensible platform for the development of CRM applications. It uses an object modeling concept to transform data stored in the relational database 108 into an object model to be used within the CRM Server 104 and CRM Client 102. This allows the CRM Server 104 and CRM Client 102 to focus on the object model and not be concerned with the SQL statements required to access the relational database 108.

In the exemplary architecture, the CRM Server 104 provides a framework for executing CRM applications, and includes a Segment Manager 200, Measure Manager 202, Functions 204, and Application Templates 206, as well as other components. The CRM Server 104 also includes an Object Manager 208 that interfaces to the RDBMS 106, wherein the Object Manager 208 includes functions related to SQL Generation 210, SQL Execution 212, and an application programming interface (API) 214 to the TeraMiner™ product provided by NCR Corporation, the assignee of the present invention.

Metadata

The functions performed by the CRM Server 104 and its components are metadata-driven, wherein the metadata describes one or more "Business Models" and one or more "Business Rules." Metadata defines the mapping between objects instantiated in the CRM Server 104 and the data stored in the relational database 108. In this regard, the metadata supports the mapping of Segments, Attributes, Filters, and Measures to the relational database 108.

Segment Manager

The Segment Manager 200 provides a common segmentation engine for use by the other elements of the CRM Server 104. The Segment Manager 200 supports user requests, such as defining Segments, applying Measures and Filters to Segments, profiling Segments, saving Segments, and displaying Segments, as well as merging Segments, removing duplicate entries from Segments, deleting Segments, etc. Users can choose from a set of pre-defined Segments or create ad hoc Segments.

Measure Manager

The Measure Manager 202 provides a common measurement engine for use by the other elements of the CRM Server 104. A Measure is a value or expression applied to a Segment. A Measure may be a simple base measurement (e.g., mapped directly to a field of a table in the relational database 108 or calculated on one or more such fields), or a compound derivative measurement (a calculation involving one or more base measurements). Users can choose from a set of pre-defined Measures or create ad hoc Measures.

Functions

A Function 204 is a module that provides a control service in an Application Template 204. A Function 204 may be a standardized programming element that allows the user to control the sequence of steps, or a customized programming element.

Application Templates

An Application Template 206 is a sequence of Segments, Filters, Measures and Functions linked together in a workflow. The sequence that comprise a workflow in the Application Templates 206 are represented as icons that are linked together, wherein the direction of the connecting arrows determine the sequence of execution and the flow of data.

Users can choose from a set of pre-defined Application Templates 206 or create ad hoc Application Templates 206, as desired. In either case, the user can create and manipulate the Application Template 206. Further, users can add, modify and delete the steps within the Application Template 206.

Object Manager

The Object Manager 208 instantiates data from the relational database 108 via the RDBMS 106, and wraps that data in objects for use by the Segment Manager 200, Measure Manager 206, Functions 204, Application Templates 206, and other elements of the CRM Server 104. The Object Manager 208 interprets the metadata, generates the necessary SQL statements in module 210, and then executes the generated SQL statements in module 212. Object classes that represent business models can be mapped to tables in the relational database 108, thereby providing an object-oriented (OO) representation of the relational database 108. This provides a certain degree of independence from the schema of the relational database 108.

TeraMiner™

The Object Manager 208 also provides a module 214 that accesses an application programming interface (API) to the TeraMiner™ product provided by NCR Corporation, the assignee of the present invention. The TeraMiner™ product is further described in the co-pending and commonly-assigned application Ser. No. 09/410,530, filed on Oct. 1, 1999, by Todd M. Brye, entitled "SQL-Based Analytic Algorithm for Rule Induction," attorney's docket number 8221, which application is incorporated by reference herein.

TeraMiner™ provides functionality that allows the RDBMS 106 to support data mining operations against the relational database 108. In TeraMiner™, advanced analytic processing capabilities for data mining applications are placed where they belong, i.e., close to the data. Moreover, the results of these analytic processing capabilities can be made to persist within the database 108 or can be exported from the database 108. These analytic processing capabilities and their results are exposed externally to the RDBMS 106 by the application programmable interface (API).

CRM Client

Figure 3:
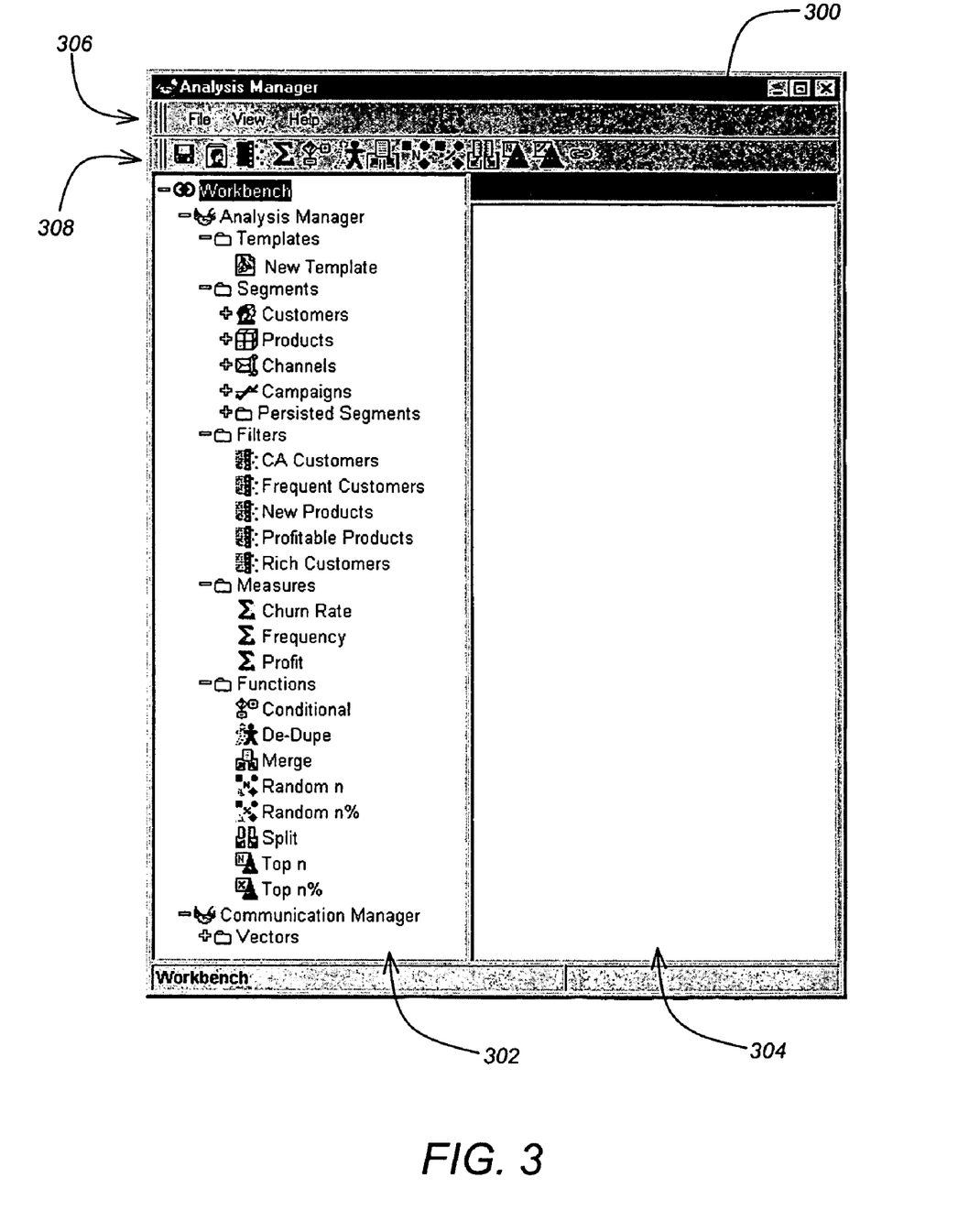
FIG. 3 illustrates a graphical user interface (GUI) of the Customer Relationship Management (CRM) Client according to the preferred embodiment of the present invention.

FIG. 3 illustrates a graphical user interface (GUI) 300 of the CRM Client 102 according to the preferred embodiment of the present invention. The CRM Client 102 is a web browser application that provides a "workbench" that uses a visual programming metaphor to assist the user in creating, modifying, deleting, and executing Application Templates 206.

The GUI of the CRM Client 102 is divided into two panes 302 and 304, with a menu bar 306 and tool bar 308 above the panes 302 and 304.

With regard to the menu bar 306, from left to right, the menus comprise "File," "View," and "Help" menus. These menus and their associated functions are similar to those found in any application.

With regard to the tool bar 308, from left to right, the icons represent the functions: "save current template," "segment," "filter," "measure," "conditional," "de-duplicating," "merge," "random N," "random %," "split," "top N," "top %," and "link." These functions are described in more detail below:

The "save current template" function saves the Application Template 206 displayed in pane 304 to a specified storage location, either on the CRM Client 102 or CRM Server 104.

The "segment" function allows the user to perform a number of different tasks related to segments, including: Get a Segment, Persist a Segment, etc.

The "filter" function allows the user to perform a number of different tasks related to Filters, including: Constrain a Segment (reduce its size based on Attribute selection criteria, e.g., "Disposable Income >$40000"), Profile a Segment (retrieve a pre-defined set of its Attributes), etc.

The "measure" function allows the user to perform a number of different tasks related to Measures, including: Apply Measures to Segment (e.g., calculate "Profitability" for "California Customers"), Define a Measure (which includes a "Define a Derived Measure"), etc.

The "conditional" function causes a conditional branch on a stream. Conditional branching is based on values of a Measure (e.g., If Value=Top 20% Do A, Else Do B). Branching can be a binary decision or multiple choice decision, similar to a case statement. Normally, conditional branches will join back into a single flow.

The "de-duplicating" function refers to de-duplication and removes all duplicate records (i.e., rows having the same primary key value) in a merged Segment.

The "merge" function merges back a previously split workflow into a single stream. Two types of "merge" are supported: (1) "classic merge" which when merging a Segment X with attributes A and B with Segment Y with attributes B and C, will return a Segment Z with attribute B, and (2) "merge with de-dupe" which when merging a Segment X with attributes A and B with Segment Y with attributes B and C, will return Segment Z with attributes A, B, and C. All duplicates of attribute B will be removed. Also, the merge function requires that the two Segments being merged come from the same top level Segment.

The "random N" function returns a random sample of size N of the Segment.

The "random %" function returns a random sample of size N percentile of the Segment.

The "split" function causes the workflow to branch out into two or more separate, concurrent flows based on the value of a Measure or Attribute.

The "top N" function returns the top N number from the Segment.

The "top %" function returns the top N percentile from the Segment.

The "link" function links two steps in the workflow together.

In the left hand pane 302, a tree display shows a hierarchy comprised of a Workbench level having a subordinate Analysis Manager level. The Analysis Manager includes subordinate levels comprised of Templates, Segments, Filters, Measures, and Functions. Each of these subordinate levels includes zero or more copies of the specified components that have been created and are available for reuse. New copies of the specified components can be created using a "New" function from the "File" menu.

The icons from the left hand pane 302 or the tool bar 308 may be "dragged and dropped" onto the right hand pane 304 and then linked together to create the sequence of steps that comprise the workflow of an Application Template 206. The sequence of the icons and the direction of the connecting arrows determine the sequence of execution and data flow.

Users can choose from a set of pre-defined Application Templates 206 from the tree display of the left-hand pane 302 or create ad hoc Application Templates 206, as desired. In either case, the user can create and manipulate the Application Template 206. Further, users can add, modify and delete the steps (icons) within the Application Template 206.

Incorporating Predictive Models

In the preferred embodiment, the CRM Client 102 can invoke an analytic algorithm for rule induction via the module 214 of the Object Manager 208 to perform the "Define a Derived Measure" task of the "measure" function, thereby creating a predictive model, instead of the user providing the definition of the Measure (in the form of a formula). The module 214 accesses or invokes the application programming interface (API) to the TeraMiner™ product to invoke the analytic algorithm for rule induction. This analytic algorithm for rule induction is further described in the co-pending and commonly-assigned application Ser. No. 09/410,530, filed on Oct. 1, 1999, by Todd M. Brye, entitled "SQL-Based Analytic Algorithm for Rule Induction," attorney's docket number 8221, which application is incorporated by reference herein.

The analytic algorithm for rule induction provided by the TeraMiner™ product builds a predictive model based on the Segment and related Attributes presented to it, and returns the model as the new Measure. The Measure (i.e., the model) can then be used against other Segments with matching Attribute definitions (using the "Apply Measures to Segment" task of the "segment" function), for test purposes and later for deployment purposes.

Figure 4:
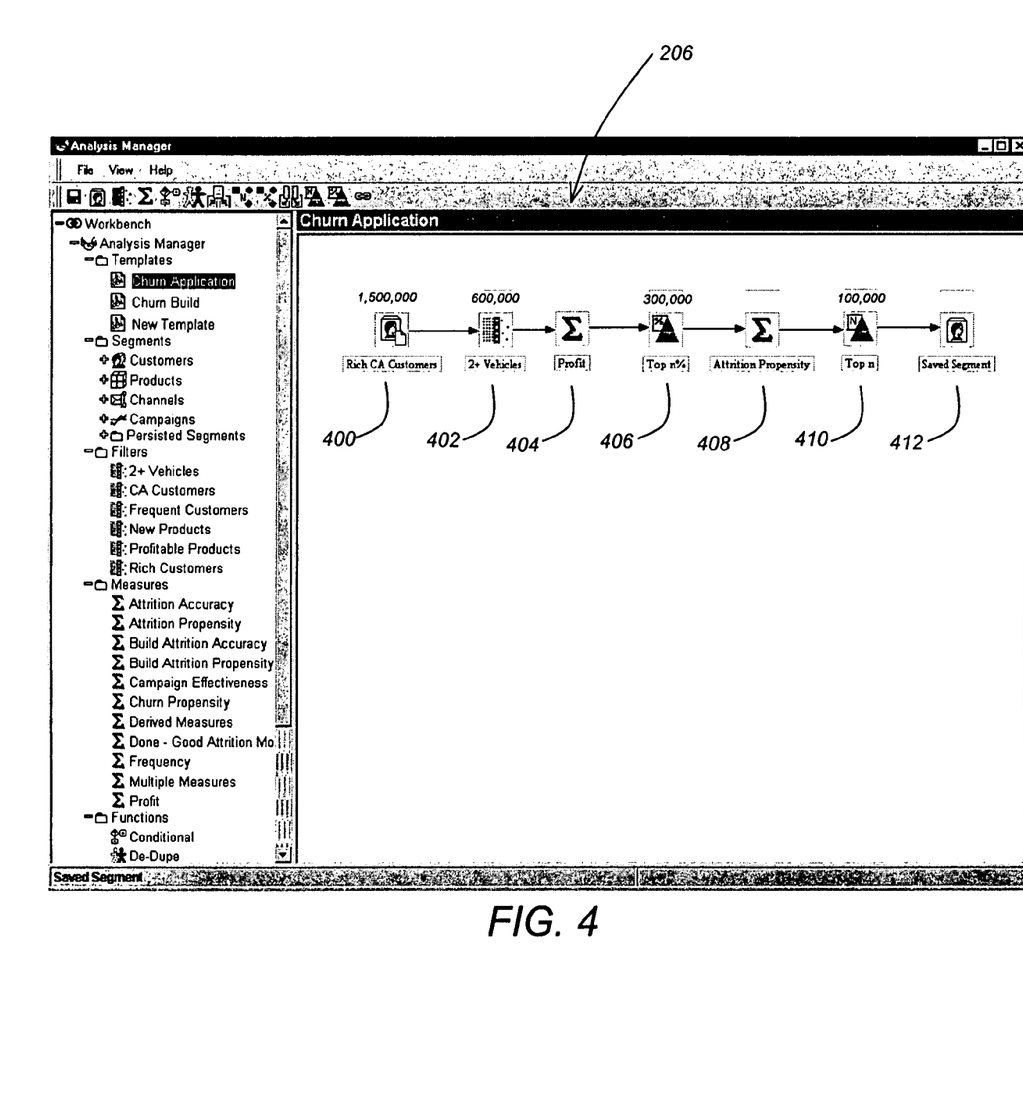
FIG. 4 illustrates an Application Template used to incorporate a predictive model according to the preferred embodiment of the present invention.

The use of the predictive model is illustrated in the workflow of FIG. 4, described further below, which represents an Application Template 206 that might be used in a customer retention campaign (i.e., using a predictive model that will identify those customers that have a high likelihood for attrition). This workflow is a simplified subset of a deployment phase of a standard data mining process.

In order to produce the best results from the workflow illustrated below, it would be necessary for a skilled user to have previously built a predictive model for the class of problem at hand (in this example, Attrition Propensity scoring), and to have recorded the key knowledge gained from this exercise in the form of such a reusable Application Template 206, such that less skilled users can benefit from this knowledge.

The Application Template 206 records such knowledge as:
  what type of customers (or ex-customers) to use in building the model,
  which Attributes and Measures are potential predictors of the target behavior (including any derived variables, recreated in the form of Derived Measures).

This knowledge is used as the starting point for the user, who adapts the Application Template 206 to the particular context of the business problem at hand. In addition to changing initial default values (e.g., the model accuracy requirement), this might include selecting a customer segment as the input set, selecting a set of input variables (Attributes and Measures), and applying the derived Measures.

Example Application Template

The following describes an example Application Template 206.

Assume that a cellular phone company has been losing customers in California, due to increased competition in the state. The user develops a retention campaign to target current customers with a special offer aimed at retaining them by offering them an attractive 1-year early renewal package. She selects the target group first by narrowing the "California Customers" Segments down to a "Rich CA Customers" Sub-Segment, i.e., those who own 2 or more vehicles and who have a disposable income above $40,000. The "Rich CA Customers" Sub-Segment is further constrained by selecting only the most profitable 50% of these customers, then ranking these customers on a compound calculation of profitability multiplied by likelihood of attrition, and selecting only the top 100,000 of these customers (i.e., those customers with high profitability and high likelihood of attrition). In creating the retention campaign, the user invokes a previously-built Attrition Propensity model that predicts which customers are most likely to terminate their service with the company. This is illustrated in the following 7-step workflow.

Figure 5:
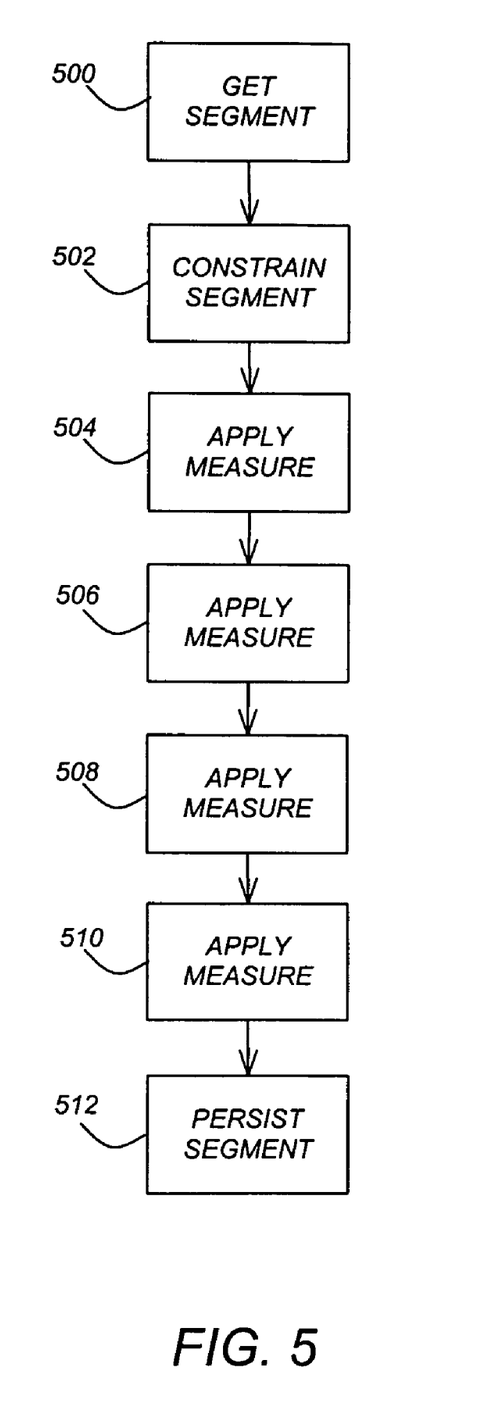
FIG. 5 is a flowchart that illustrates the logic used to incorporate a predictive model according to the preferred embodiment of the present invention.

Referring to FIG. 4, an example Application Template 206 is shown, wherein the Application Template 206 includes a workflow comprising a sequence of steps using icons. The sequence and data moves along the flow of the arrows linking the various icons. The logic of the Application Template 206 is described below in conjunction with FIG. 5:

Icon 400 represents a "Get a Segment" task for a Segment referred to as "Rich CA Customers," Segment (Block 500). The "Rich CA Customers" Segment is comprised of 1,500,000 customers as indicated by the label.

Icon 402 represents a "Constrain a Segment" task performed against the resulting Segment to create a Sub-Segment "2+ Vehicles" (Block 502). Before running the task, the Application Template 206 prompts the user to optionally subset the list of Attributes to be returned in the Sub-Segment (the initial default is "all," but this may be modified by the user). In this step, a Sub-Segment is selected of those "Rich CA Customers" who own 2 or more vehicles ("Vehicle Ownership" Attribute >1") and have more than $40,000 in disposable income ("Disposable Income" Attribute >40,000"), thereby yielding a Sub-Segment of 600,000 customers as indicated by the label.

Icon 404 represents an "Apply Measures to Segment" task performed against the Sub-Segment (Block 504). The Application Template 206 executes a "Profit" Measure against the Sub-Segment, which calculates the profitability of the customers (e.g., revenues minus expenses).

Icon 406 represents an "Apply Measures to Segment" task performed against the Sub-Segment (Block 506). The Application Template 206 executes a "Top n%" Measure against the Sub-Segment, which orders the customers by profitability and selects only the top 50% of the resulting ordered customers, thereby yielding a Sub-Segment of 300,000 customers as indicated by the label.

Icon 408 represents an "Apply Measures to Segment" task being performed against the Sub-Segment (Block 408). The Application Template 206 executes a rule induction tree against the Sub-Segment to compute the Measure "Attrition Propensity" for each record therein ("Attrition Propensity" is the name given to output of the rule induction tree). In the preferred embodiment, the Measure "Attrition Propensity" is the predicted attrition propensity score, normalized to a range of 0 to 100. Although the Measure "Attrition Propensity" could be a pre-calculated score, it is calculated dynamically in the preferred embodiment by executing an Attrition Propensity predictive model against the Sub-Segment. A key aspect of the present invention is this dynamic application of a predictive model to achieve such effects as dynamic scoring.

In the preferred embodiment, the Measure "Attrition Propensity" is built as described in the co-pending and commonly-assigned application Ser. No. 09/608,496 entitled "BUILDING PREDICTIVE MODELS WITH INTERACTIVE BUSINESS ANALYSIS PROCESSES," filed on same date herewith, by Ken O'Flaherty. Specifically, the Application Template 206 builds the rule induction tree (also known as a decision tree model) by invoking a model-building algorithm (e.g., the analytic algorithm for rule induction) via the module 214 of the Object Manager 208, wherein the module 214 accesses or invokes the application programming interface (API) to the TeraMiner™ product and the analytic algorithm for rule induction as described in the co-pending and commonly-assigned application Ser. No. 09/410,530, filed on Oct. 1, 1999, by Todd M. Brye, entitled "SQL-Based Analytic Algorithm for Rule Induction," which application is incorporated by reference herein.

The analytic algorithm for rule induction in the TeraMiner™ product uses the RDBMS 106 to retrieve counts and order data within the database 108, and then extracts the information to determine the rules or splits in the rule induction tree. The rule induction tree comprises a predictive model (a formula in SQL) that predicts the likelihood for attrition. One advantage to the rule induction tree is that it is invoked automatically and transparently by the user as part of the workflow in the Application Template 206 using familiar business terms.

When the Measure "Attrition Propensity" is executed, such that it is applied against the current Sub-Segment in the workflow, it dynamically estimates the propensity for attrition of each customer in the Sub-Segment, using the previously-built predictive model (e.g., the rule induction model), thereby generating a propensity score for each customer. Thus, the attrition propensity estimate is fully up-to-date for each customer, because it uses the current values for each of the input variables required by the model. In data mining terminology, this is an example of "model deployment," i.e., deploying or executing a previously-built predictive model.

Icon 410 represents an "Apply Measures to Segment" task performed against the Sub-Segment (Block 510). The Application Template 206 executes a "Top n" Measure against the Sub-Segment, which orders the customers by profitability and selects only the top 100,000 of the resulting ordered customers, thereby yielding a Sub-Segment of 100,000 customers as indicated by the label.

At icon 412, the resulting Sub-Segment can be saved or persisted (Block 512).

CONCLUSION

This concludes the description of the preferred embodiment of the invention. The following paragraphs describe some alternative embodiments for accomplishing the same invention.

In one alternative embodiment, any type of computer could be used to implement the present invention. In addition, any database management system, decision support system, on-line analytic processing system, or other computer program that performs similar functions could be used with the present invention.

In summary, the present invention discloses a Customer Relationship Management (CRM) system that incorporates predictive models. The system is used by business users who are unfamiliar with the art of data mining. The predictive model, which is constructed by a model-building mechanism in a data mining subsystem, accepts the appropriate input attributes, performs calculations against a segment comprised of records, and generates an output attribute.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for using predictive models within a computer-implemented business analysis environment, comprising:
  (a) applying a derived measure against a segment, wherein the derived measure comprises a predictive model previously-built by a model-building mechanism in a data mining system, wherein the derived measure is invoked within an application template that is a sequence of one or more icons representing segments, filters, measures and functions and the icons are linked together in a workflow, and wherein the application template is used to save the sequence of icons linked together in the workflow; and
  (b) generating output for the segment from the predictive model in the form of measure values.

2. The method of claim 1, wherein connecting arrows between the icons determine a sequence of execution and a flow of data.

3. The method of claim 2, wherein the application template is constructed in a visual programming environment by dragging and dropping the icons in a graphical user interface and then linking together the icons to create the sequence of steps that comprise the workflow of the application template.

4. The method of claim 1, wherein the application templates are reused or modified by users.

5. The method of claim 1, wherein a segment is a grouping of data elements from a database organized about one or more attributes.

6. The method of claim 1, wherein a filter defines one or more attribute constraints applied to a segment.

7. The method of claim 1, wherein a profile is a labeled collection of attributes of a segment.

8. The method of claim 1, wherein a measure is an expression applied to a segment.

9. The method of claim 1, wherein the computer-implemented business analysis environment includes an object model, and the segments, attributes, filters, and measures comprise objects.

10. The method of claim 9, wherein operations upon the objects are translated into SQL statements that access corresponding tables and columns in a relational database.

11. The method of claim 1, wherein the predictive model comprises one or more SQL statements that access tables and columns in a relational database.

12. The method of claim 1, wherein the predictive model comprises one or more statements executed by a database management system.

13. The method of claim 12, wherein the statements access data stored in the database management system.

14. The method of claim 1, wherein the model-building mechanism comprises an analytic algorithm for rule induction performed against data stored in a database management system to create the predictive model.

15. A computer-implemented system for using predictive models within a computer-implemented business analysis environment, comprising:
(a) means for applying a derived measure against a segment, wherein the derived measure comprises a predictive model previously-built by a model-building mechanism in a data mining system, wherein the derived measure is invoked within an application template that is a sequence of one or more icons representing segments, filters, measures and functions and the icons are linked together in a workflow, and wherein the application template is used to save the sequence of icons linked together in the workflow; and
(b) means for generating output for the segment from the predictive model in the form of measure values.

16. The system of claim 15, wherein connecting arrows between the icons determine a sequence of execution and a flow of data.

17. The system of claim 16, wherein the application template is constructed in a visual programming environment by dragging and dropping the icons in a graphical user interface and then linking together the icons to create the sequence of steps that comprise the workflow of the application template.

18. The system of claim 15, wherein the application templates are reused or modified by users.

19. The system of claim 15, wherein a segment is a grouping of data elements from a database organized about one or more attributes.

20. The system of claim 15, wherein a filter defines one or more attribute constraints applied to a segment.

21. The system of claim 15, wherein a profile is a labeled collection of attributes of a segment.

22. The system of claim 15, wherein a measure is an expression applied to a segment.

23. The system of claim 15, wherein the computer-implemented business analysis environment includes an object model, and the segments, attributes, filters, and measures comprise objects.

24. The method of claim 23, wherein operations upon the objects are translated into SQL statements that access corresponding tables and columns in a relational database.

25. The system of claim 15, wherein the predictive model comprises one or more SQL statements that access tables and columns in a relational database.

26. The system of claim 15, wherein the predictive model comprises one or more statements executed by a database management system.

27. The system of claim 26, wherein the statements access data stored in the database management system.

28. The system of claim 27, wherein the model-building mechanism comprises an analytic algorithm for rule induction performed against data stored in a database management system to create the predictive model.

29. An article of manufacture embodying computer-executable code that, when executed by a computer, performs a method for using predictive models within a computer-implemented business analysis environment, the method comprising:
(a) applying a derived measure against a segment, wherein the derived measure comprises a predictive model previously-built by a model-building mechanism in a data mining system, wherein the derived measure is invoked within an application template that is a sequence of one or more icons representing segments, filters, measures and functions and the icons are linked together in a workflow, and wherein the application template is used to save the sequence of icons linked together in the workflow; and
(b) generating output for the segment from the predictive model in the form of measure values.

30. The article of manufacture of claim 29, wherein connecting arrows between the icons determine a sequence of execution and a flow of data.

31. The article of manufacture of claim 30, wherein the application template is constructed in a visual programming environment by dragging and dropping the icons in a graphical user interface and then linking together the icons to create the sequence of steps that comprise the workflow of the application template.

32. The article of manufacture of claim 29, wherein the application templates are reused or modified by users.

33. The article of manufacture of claim 29, wherein a segment is a grouping of data elements from a database organized about one or more attributes.

34. The article of manufacture of claim 29, wherein a filter defines one or more attribute constraints applied to a segment.

35. The article of manufacture of claim 29, wherein a profile is a labeled collection of attributes of a segment.

36. The article of manufacture of claim 29, wherein a measure is an expression applied to a segment.

37. The article of manufacture of claim 29, wherein the computer-implemented business analysis environment includes an object model, and the segments, attributes, filters, and measures comprise objects.

38. The method of claim 37, wherein operations upon the objects are translated into SQL statements that access corresponding tables and columns in a relational database.

39. The article of manufacture of claim 29, wherein the predictive model comprises one or more SQL statements that access tables and columns in a relational database.

40. The article of manufacture of claim 29, wherein the predictive model comprises one or more statements executed by a database management system.

41. The article of manufacture of claim 40, wherein the statements access data stored in the database management system.

42. The article of manufacture of claim 29, wherein the model-building mechanism comprises an analytic algorithm for rule induction performed against data stored in a database management system to create the predictive model.

* * * * *